United States Patent
Sullivan

(10) Patent No.: US 7,159,332 B2
(45) Date of Patent: Jan. 9, 2007

(54) TAPE MEASURE CLIP FOR IMPROVING MEASUREMENT ACCURACY

(76) Inventor: Daniel B. Sullivan, 115 Honeysuckle La., Durham, NC (US) 27703-9269

(*) Notice: Subject to any disclaimer, the term of this patent is extended or adjusted under 35 U.S.C. 154(b) by 0 days.

(21) Appl. No.: 10/998,484

(22) Filed: Nov. 29, 2004

(65) Prior Publication Data
US 2006/0112583 A1 Jun. 1, 2006

(51) Int. Cl.
G01B 3/10 (2006.01)
(52) U.S. Cl. .................................................. 33/770
(58) Field of Classification Search .......... 33/486–488, 33/762, 763, 768, 770, 755, 760
See application file for complete search history.

(56) References Cited

U.S. PATENT DOCUMENTS

| | | | | |
|---|---|---|---|---|
| 650,136 A * | 5/1900 | Runette | ........................ | 33/770 |
| 1,403,376 A * | 1/1922 | Ballou | ........................ | 33/770 |
| 2,591,333 A * | 4/1952 | Bellmer | ........................ | 33/770 |
| 3,255,531 A * | 6/1966 | Anderson | ........................ | 33/769 |
| 3,526,446 A * | 9/1970 | Paige et al. | ........................ | 33/488 |
| 3,744,134 A * | 7/1973 | Zima, Jr. | ........................ | 33/768 |
| 3,813,785 A * | 6/1974 | Larsen | ........................ | 33/487 |
| 4,999,924 A * | 3/1991 | Shields | ........................ | 33/770 |
| 5,083,380 A * | 1/1992 | Robertson | ........................ | 33/486 |
| 5,295,308 A * | 3/1994 | Stevens et al. | ........................ | 33/770 |
| 5,606,803 A * | 3/1997 | O'Sullivan | ........................ | 33/770 |
| 6,094,833 A * | 8/2000 | Medley, Jr. | ........................ | 33/770 |
| 6,497,050 B1 * | 12/2002 | Ricalde | ........................ | 33/770 |
| 6,804,898 B1 * | 10/2004 | Hsu | ........................ | 33/770 |

* cited by examiner

Primary Examiner—G. Bradley Bennett

(57) ABSTRACT

Provided is a caliper extender (100), which fits over a tape measure blade (124), enabling accurate measurements to be taken of an inside dimension (142). Extender (100) slides along blade (124) and is positioned against one wall of the inside dimension (142). Blade (124) is then repositioned flat against extender (100) and a measurement reading is taken. A pointer (110) may also be incorporated into extender (100) to indicate a tape marking (202, 204, 206, 208 or 210) corresponding to an accurate measurement. In the alternative, a caliper extender (160) is incorporated into a tape measure (350) such that extender (160) can be disengaged from a casing (352) of tape measure (350), slid along a blade (190) and a measurement reading taken through a window (308) in a channel (304) through which blade (190) is installed.

10 Claims, 13 Drawing Sheets

TAPE MEASURE CLIP FOR IMPROVING MEASUREMENT ACCURACY

TECHNICAL FIELD OF THE DISCLOSURE

This disclosure pertains generally to a tape measure and related attachment and, more specifically, to a tape measure with a clip that improves the accuracy of the tape measure.

BACKGROUND OF THE DISCLOSURE

A tape measure is a common tool in many households and carpenters' tool belts. The typical tape measure consists of a metal tape, or "blade," with inscribed or printed markings, beginning at '0' at a "hook" end, and extending the length of the blade, each mark designating the corresponding distance from the hook end in either metric or English measurements. The end opposite the hook end will be referred to as the "measurement" end. At the hook end is an metal angle that both blunts the sharp edge of the blade and can be positioned around the edge of an object to be measured, thus holding the tape measure in place during a measurement operation.

Often, the blade is wound into a metal or plastic casing, measurement end first, from which the blade can be pulled. Such a casing not only facilitates the use of the tape measure by keeping unnecessary length out of the way but also makes the tape measure more compact for storage. In addition, blades are typically spring-loaded so that they can be easily retracted into the case when desired. A button on the case engages and disengages a stop that is positioned against the blade so that the blade is not inadvertently extended or retracted at an inappropriate time.

Achieving an accurate measurement with a tape measurement can sometimes be a tricky proposition. The hook end is positioned around an object to be measured, the blade is positioned over the object and a length corresponding to the object is ascertained by reading the markings inscribed or printed on the blade. This procedure is relatively straightforward when the object to be measured is a stand-alone object such as a length of wood. However, the procedure is more complex if the measurement to be taken is an inside measurement, such as the inside of a box. In this situation, the hook end is placed against one inside wall of the object and the blade is bent at the measurement end in an attempt to position the blade against the other inside wall. However, since the blade can not typically be bent into a ninety degree (90°) angle, a user must estimate where the blade would fit against the inside wall if it could be bent into such an angle. This estimation introduces an error into the procedure, even for the experienced user.

This disclosure describes a device that affixes onto the blade of a tape measure and serves to improve the accuracy of the tape measure by eliminating any uncertainty caused by the bending of the blade at the measurement end. These and other advantages, as well as additional inventive features, will be apparent from the present disclosure.

BRIEF DESCRIPTION OF THE FIGURES

For a more complete understanding of the present disclosure, and the advantages thereof, reference is now made to the following brief descriptions taken in conjunction with the accompanying figures, in which like reference numerals indicate like features.

FIG. 9 is an illustration of an alternative embodiment of the claimed caliper extender that may be incorporated into a typical, retractable-type tape measure.

DETAILED DESCRIPTION

This disclosure provides a [insert a brief description of the invention (e.g., a prose version of the independent claims)].

Other aspects, objectives and advantages of the invention will become more apparent from the remainder of the detailed description when taken in conjunction with the accompanying drawings.

Figure 1:
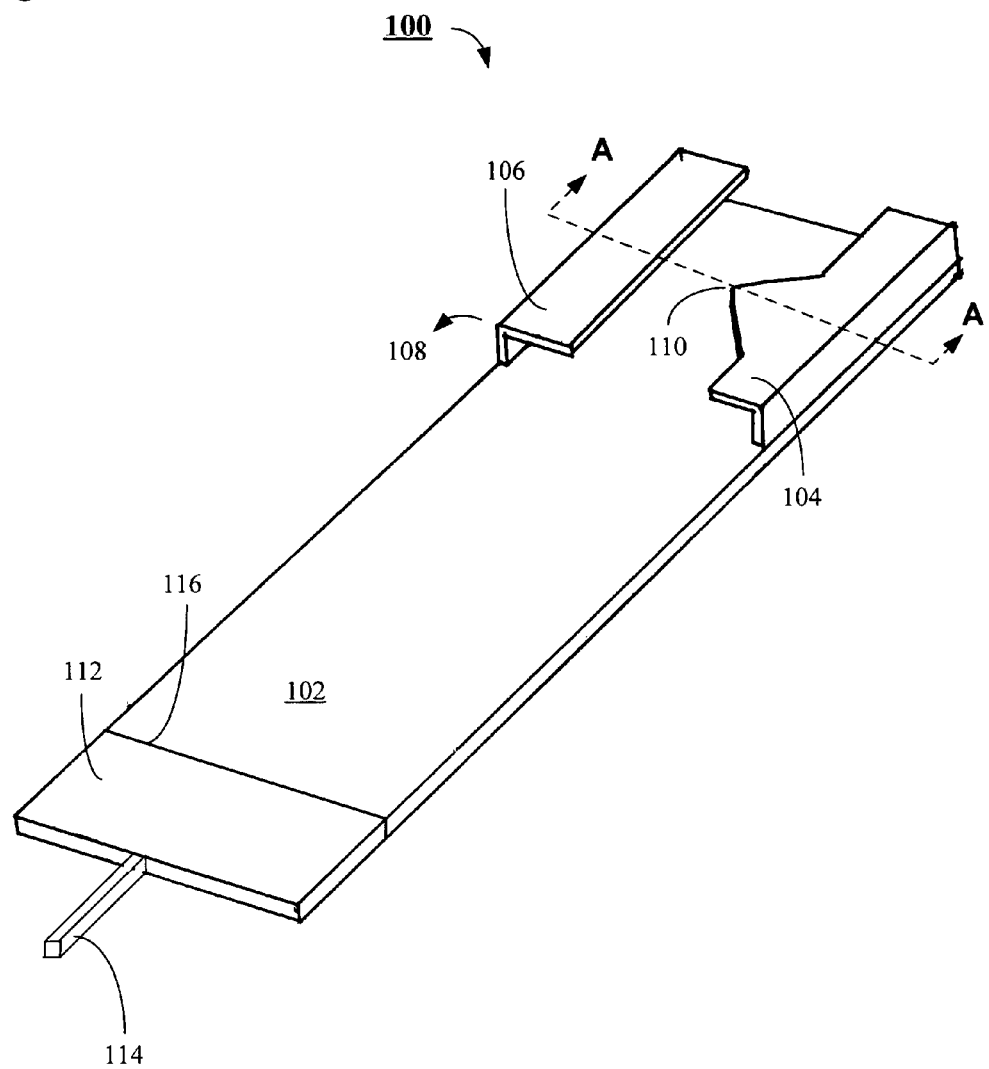
FIG. 1 is an illustration of a caliper extender claimed herein.

FIG. 1 illustrates a caliper extender 100 constructed in accordance with the claimed subject matter. Extender 100 includes an extender body 102 that is, when caliper extender 100 is in use, positioned against a tape measure blade, such as a tape measure blade 124 (see FIGS. 2–5).

Attached to body 102 is a clip 104 that hooks around blade 124 to hold extender body 102 of extender 100 in position against blade 124. Extender body 102 is held against blade 124 with just enough force to enable extender 100 to slide along blade 124. An attachment clip 106 is positioned across from clip 104 on extender body 102. Clips 104 and 106 are described in more detail below in conjunction with FIG. 2 from a perspective A, shown in FIG. 1 by dotted lines.

Attachment clip 106 also holds extender body 102 against blade 124, applying enough force to position blade 124 and yet still enabling extender 100 to slide along blade 124. Attachment clip 106 is designed to be flexible enough to be pushed back, as indicated by arrow 108, to provide enough room for blade 124 to be slipped under clip 104. When released, attachment clip 106 then returns to its original position, sliding over blade 124. Thus, clips 104 and 106 work together to hold extender body 102 against blade 124.

A measurement pointer 110 on clip 104 enables a user to accurately determine a position on blade 124 for measurement purposes. The use of pointer 110 is explained in more detail below in conjunction with FIGS. 3–5.

An end extension 112 attaches to body 102 at an end 116 of caliper extender 100 opposite the end with clips 104 and 106. Extension 112 may come in different configurations, enabling caliper extender 100 to take measurements of different types of objects. For example, extension 112 has a protrusion 114 that is inserted into a hole (not shown) so that a measurement that includes the depth of the hole can be taken. Many other configurations of extensions are possible. For example, one configuration may enable caliper extender 100 to take a measurement of a corner (see FIG. 8).

Figure 2:
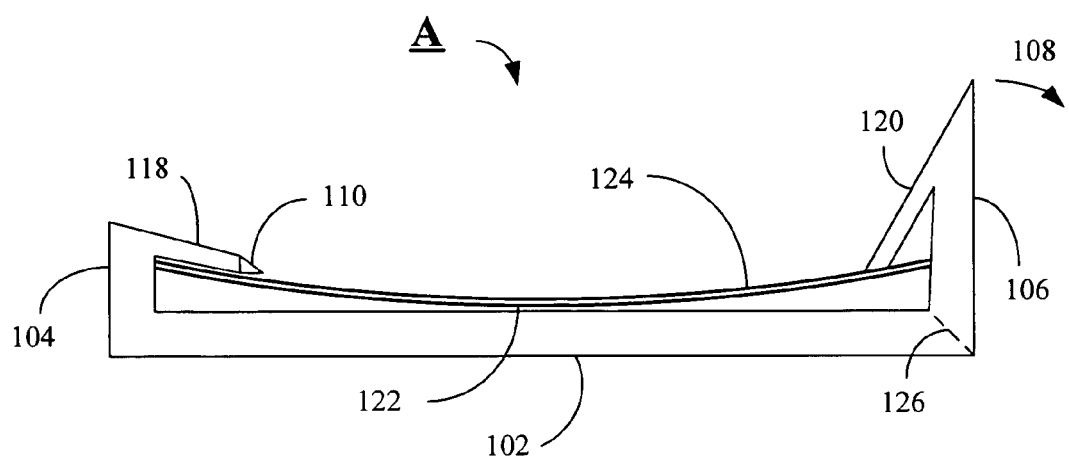
FIG. 2 is an illustration of the caliper extender of FIG. 1 from a different perspective.

FIG. 2 is an illustration of caliper extender 100 from perspective A as shown in FIG. 1. Also shown are extender body 102, clip 104, attachment clip 106 and pointer 110. Clip 104 extends perpendicularly from body 102 and includes a cap portion 118 that holds a blade 124 against body 102 at a point 122. Attachment clip 106 also extends perpendicularly from body 102. Clip 106 includes a positioning arm 120 that also serves to hold blade 124 against body 102 at point 122. By applying pressure, clip 106 can be swiveled outward in a direction 108 in order to insert blade 124 into caliper extender 100. This swivel motion can be enabled either by the flexibility of the material, such as but not limited to plastic, which caliper extender 100 is constructed, or enabled by a joint 126 between body 102 and clip 106. In the alternative, there may be a joint between arm 120 and the remainder of clip 106. When the pressure is removed, clip 106 and arm 120 return to their original position, as shown in this figure.

It should be noted that blade 124 has a slight concave shape (if viewed from the top). This is a typical feature in many tape measure blades, provided so that lengths of blade 124 can be held horizontally without bending. This convex shape also facilitates the holding of tape 124 against point 122 by cap 118 and arm 120, while allowing tape 124 to slide back and forth along caliper extender 100. Of course, the claimed subject matter is equally applicable to a tape measure without a concave or convex shape. In addition, body 102 may be concave to conform to the shape of blade 124.

Figure 3:
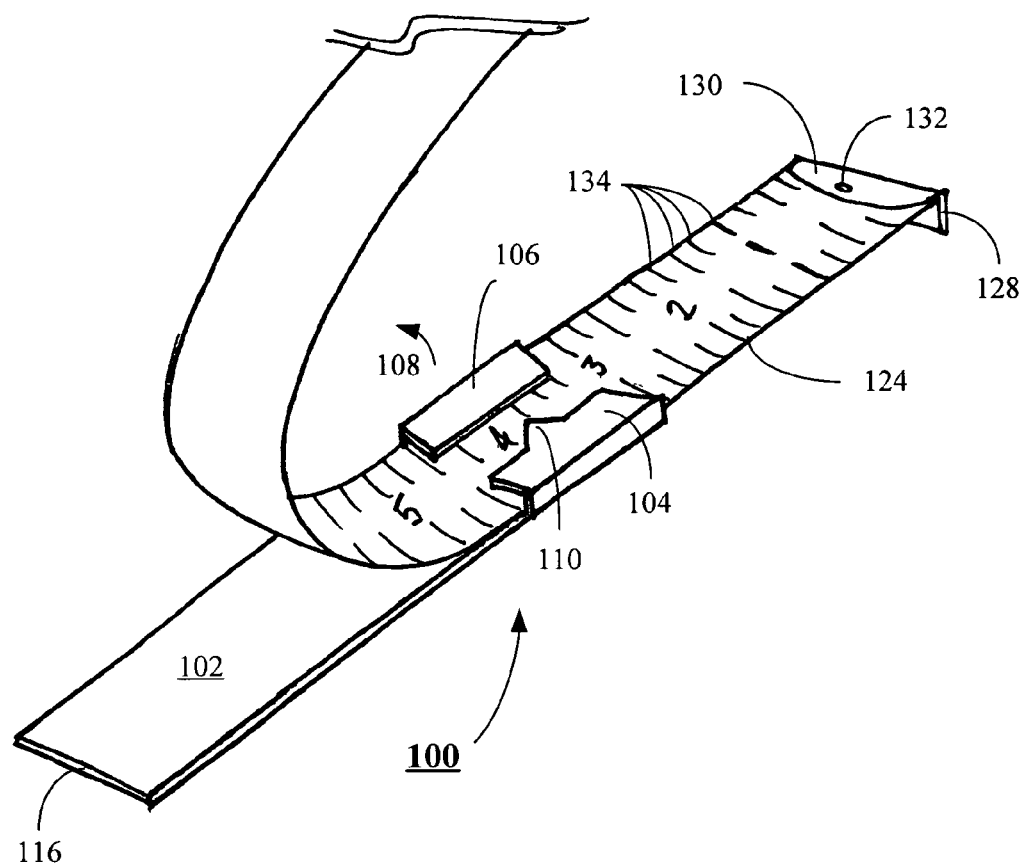
FIG. 3 is an illustration of the caliper extender of FIGS. 1 and 2 with a tape measure blade installed.

FIG. 3 is a view of caliper extender 100 (FIGS. 1 and 2) from the perspective of FIG. 1 with tape blade 124 installed. In this example, caliper extender 100 does not have an extension such as extension 112 (FIG. 1) attached. As explained above in conjunction with FIG. 2, blade 124 is inserted into caliper extender 100 by applying pressure to clip 106 in direction 108, placing blade 124 into extender 100 underneath clip 104 and releasing the pressure so that clip 106 returns to its original position.

Attached to blade 124 is a hook 128, which includes a section 130, extending from hook 128 at a ninety degree (90°) angle. Section 130 conforms to blade 124, i.e. has a concave shape, so that section 130 can be positioned against blade 124. Hook 128 is employed both to hold blade 124 against an object to be measured and to prevent blade 124 from being retracted into a casing 250 (see FIGS. 8–10).

In this example, hook 128 is attached to blade 124 by means of one or more rivets 132 that extend through section 130 and blade 124. Blade 124 also includes markings 134 (only a few of which are numbered) that indicate the distance from hook 128 to their respective positions on blade 124. Typically, markings 134 are calibrated to either Metric or English measurements.

Pointer 110 (FIGS. 1 and 2) provides a precise point on blade 124 from which a measurement can be taken by noting the specific marking 134 to which pointer 110 points. The value of the marking 134 corresponding to the position of pointer 110 after a measurement is employed to determine a precise measurement. One method of determining a measurement is to add a fixed amount, corresponding to the distance between pointer 110 and end 116 of body 102, or the distance to the end of an extension (if attached), to the value of marking 132 corresponding to the position of pointer 110. Other possible methods of determining precise measurements are discussed below in conjunction with FIGS. 5 and 6.

It should be noted that blade 124 is shown extending from hook 128, through caliper extender 100 and then bending upwards. The relevance of this particular position of blade 124 is explained in more detail below in conjunction with FIG. 4.

Figure 4:
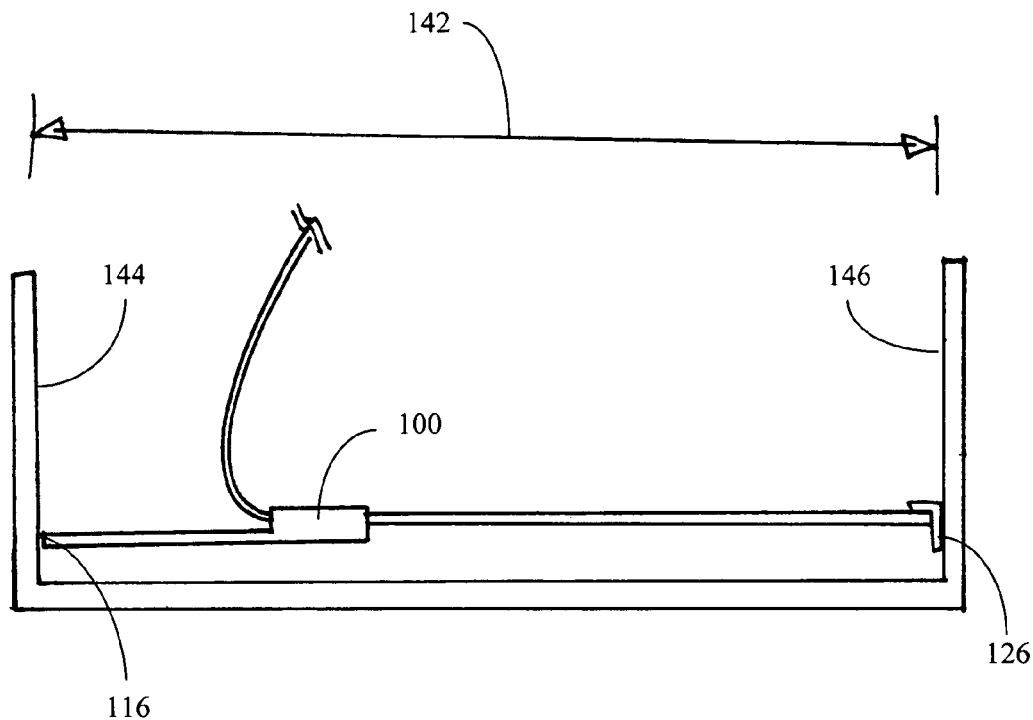
FIG. 4 illustrates a method of employing the caliper extender of FIGS. 1–3 to accurately take an inside measurement.

FIG. 4 illustrates a method of employing caliper extender 100, described above in conjunction with FIGS. 1–3, to accurately take a measurement of an inside dimension 142. Inside dimension 142 represents the distance between a wall 144 and a wall 146. In this example, extension 112 (FIG. 1) is not attached to caliper 100.

To take an accurate measurement of inside dimension 142, caliper extender 100 is fastened onto blade 124 (FIG. 2), end 116 (FIGS. 1 and 3) of caliper extender 100 is positioned against wall 144, and hook 126 of blade 124 (FIG. 3) is extended to wall 146. The portion of tape blade 124 that is extended towards end 116 through clips 104 and 106 is bent out of the way so that the user can easily position end 116 against wall 144. Caliper extender's 100 position on blade 124 is then noted and used to provide an accurate measurement of dimension 142 as illustrated below in conjunction with FIG. 5.

Figure 5:
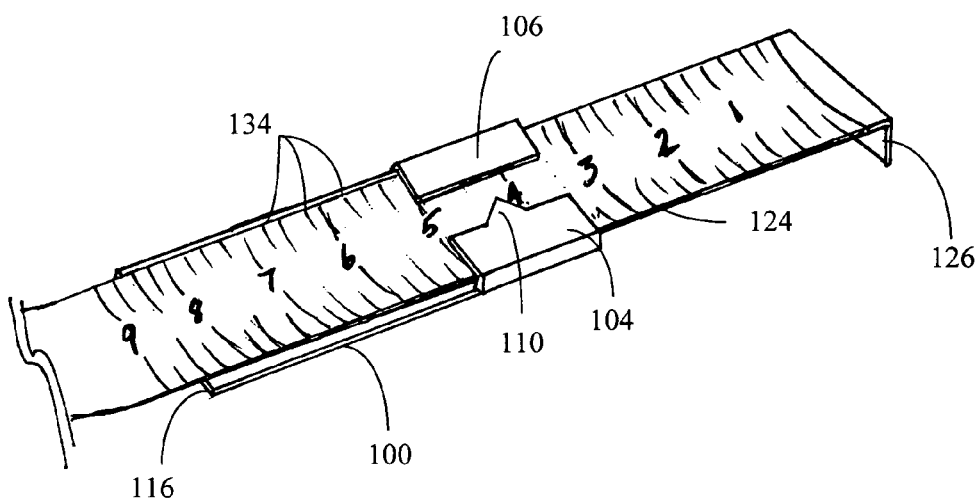
FIG. 5 illustrates one method of taking a measurement reading with the caliper extender of FIGS. 1–4.

FIG. 5 illustrates the position of caliper extender 100 (FIGS. 1–4) and blade 124 (FIGS. 2–4) after a measurement has been taken, as described above in conjunction with FIG. 4, i.e. blade 124 is positioned in the same place with respect to caliper extender 100 as shown in FIG. 4. An accurate reading of inside dimension 142 (FIG. 4) is determined by noting a marking 134 positioned at end 116 of blade 124. In the alternative, a measurement reading can be determined by noting the position of pointer 110 (FIGS. 1–3) with respect to blade 124. Either a predetermined amount, corresponding to the distance from pointer 110 to end 116, can be added to a reading based upon the standard markings of blade 124 or an alternative scale displayed on blade 124, such as the markings described below in conjunction with FIG. 7, that takes the distance between pointer 110 and end 116 into account. Of course, if an extension such as extension 112 (FIG. 1) is attached, the length of the extension must also be includes in any measurement.

Figure 6:
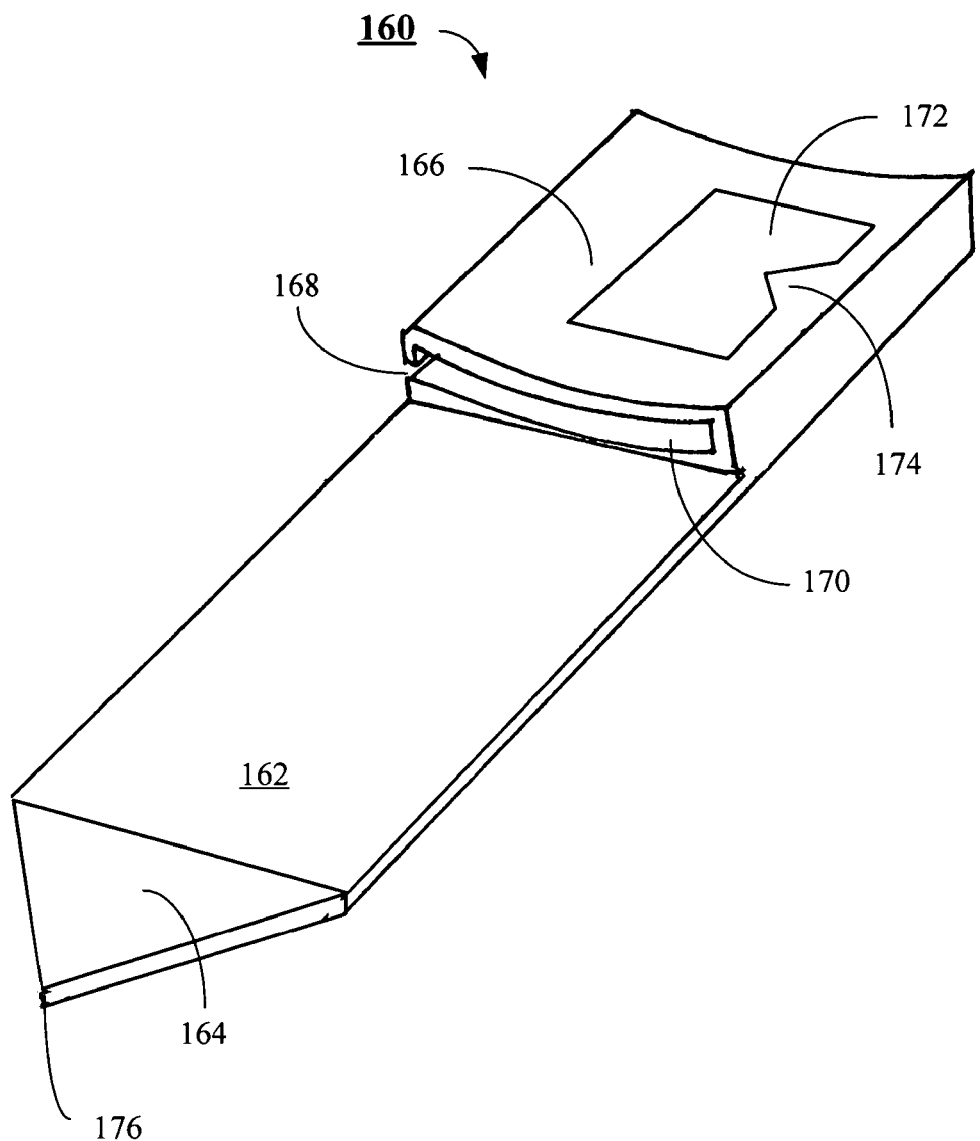
FIG. 6 is alternative embodiment of the claimed subject matter.

FIG. 6 is an illustration of a caliper extender 160, which is an alternative embodiment of the claimed subject matter. Like body 102 (FIGS. 1–5) caliper extender 160 includes a body 162. Caliper extender 160 also includes an extension 164, but rather than fitting into holes like extension 112 (FIG. 1), extension 164 is configured to enable caliper extender to be positioned into corners for measurements.

One with skill in the mechanical arts should understand how extensions 112 and 164 can be attached to various caliper extensions such as extensions 100 and 160. Further, one with skill in the art should recognize that there are many possible configurations of extensions, each designed to take a measurement in different circumstance.

To secure and guide a blade, such as, in this example, blade 124 (FIGS. 3–5), caliper extender 160 has a single clip 106 designed to flex upward so that a blade 124 can inserted into a channel 170 and positioned against body 162. An opening 168 provides a way for blade 124 to be slipped under clip 166. In other words, clip 166 is flexed upward and blade 124 is slipped through opening 168 into channel 170 underneath clip 166. Clip 166 then secures blade 124 in place.

Caliper extender 160 also includes a window 172 in clip 166 through which a blade such as blade 124 or a blade 190 (see FIG. 7) is read. A pointer 174 within window 172 provides a precise point at which to read markings 134 (FIGS. 3 and 5).

Figure 7:
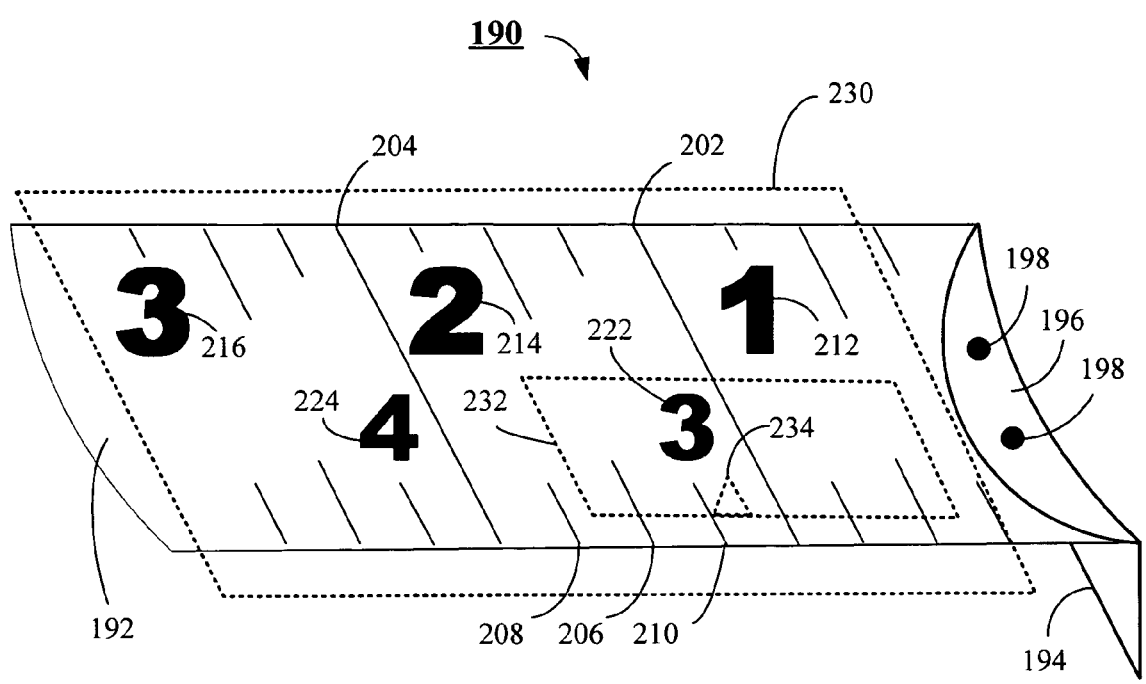
FIG. 7 is a portion of a tape measure blade employed in conjunction with various embodiments of the claimed subject matter.

FIG. 7 is a portion of a tape measure blade 190 employed in conjunction with caliper extender 160, illustrated above in FIG. 6. At one end of a blade body 192 is a hook 194 that functions like hook 122 (FIGS. 3–6). A portion 196 of hook 194 extends at a ninety degree (90°) angle from the rest of hook 194 and enables hook 194 to be attached to blade body 192 by means of one or more rivets 198. Markings 202 and 204 indicate the distance from hook 194 end of blade 190, with, in this example, marking 202 positioned one (1) inch from hook 194 and marking 204 two (2) inches from hook 194. Blade 190 also includes markings at one half (½) inch, such as marking 206, and one quarter (¼) inch, such as markings 208 and 210, increments. For the sake of simplicity, all the markings on blade 190 are not labeled. Typically, a tape measure may also includes markings (not shown) at one eighth (⅛) and one sixteenth (¹⁄₁₆) inch increments. of course, blade 190 could also be marked in Metric rather than English units.

Marking 202 is associated with a label 212, or '1', that indicates the actual distance in inches from marking 202 to hook 194. Marking 204 is associated with a label 214, or '2', that indicates the actual distance in inches from marking 204 to hook 194. A label 216 is associated with a marking (not shown) that is three (3) inches from hook 194.

A label 222, or '3', also associated with marking 202, indicates the distance from hook 194 to end 176 (FIG. 6) of caliper extender 160 when marking 202 is positioned under pointer 174 (FIG. 6). In a similar fashion, a label 224, or '4', also associated with marking 204, indicates the distance from hook 194 to end 176 of caliper extender 160 when marking 204 is positioned under pointer 174.

Also illustrated, by means of dotted lines, are a caliper extender outline 230, a tape viewing window outline 232 and a pointer outline 234. Outline 230 represents the portion of blade 190 that would be covered by caliper extender 160 if it were installed on blade 190. Outline 232 represents the portion of blade 190 that would be visible through tape viewing window 172 if caliper extender 160 were installed on blade 190. Outline 232 represents the portion of blade 190 that would be obscured by pointer 174 if caliper extender 160 were installed on blade 190. It should be noted that labels 212, 214 and 216 would be obscured by caliper extender 160 and that label 222 and nearby one half (½) inch marking 206 and one quarter (¼) inch marking 210 would be visible through tape viewing window 172. It should also be noted that labels 212, 214 and 216 are larger than labels 222 and 224 so that, when caliper extender 160 is not in use, a user's eye is drawn to labels 212, 214 and 216 rather than labels 222 and 224.

In the alternative, labels 222 and 224 can be printed in a less prominent color than labels 212, 214 and 216. Also, tape viewing window 172 may be constructed of a type of transparent material that renders labels 222 and 224 more visible than when not viewed through window 172 due to the transparent material's polarization or color filtering characteristics. Further, tape viewing window 172 may be shaped or otherwise constructed to magnify labels 222 and 224.

It should be noted that an embodiment of caliper extender 160 can be implemented without tape viewing window 172. In this case, caliper extender 160 is used to determine inside measurements, like inside measurement 142 (FIG. 5), in a fashion similar to the procedures described above in conjunction with FIG. 5.

Figure 8:
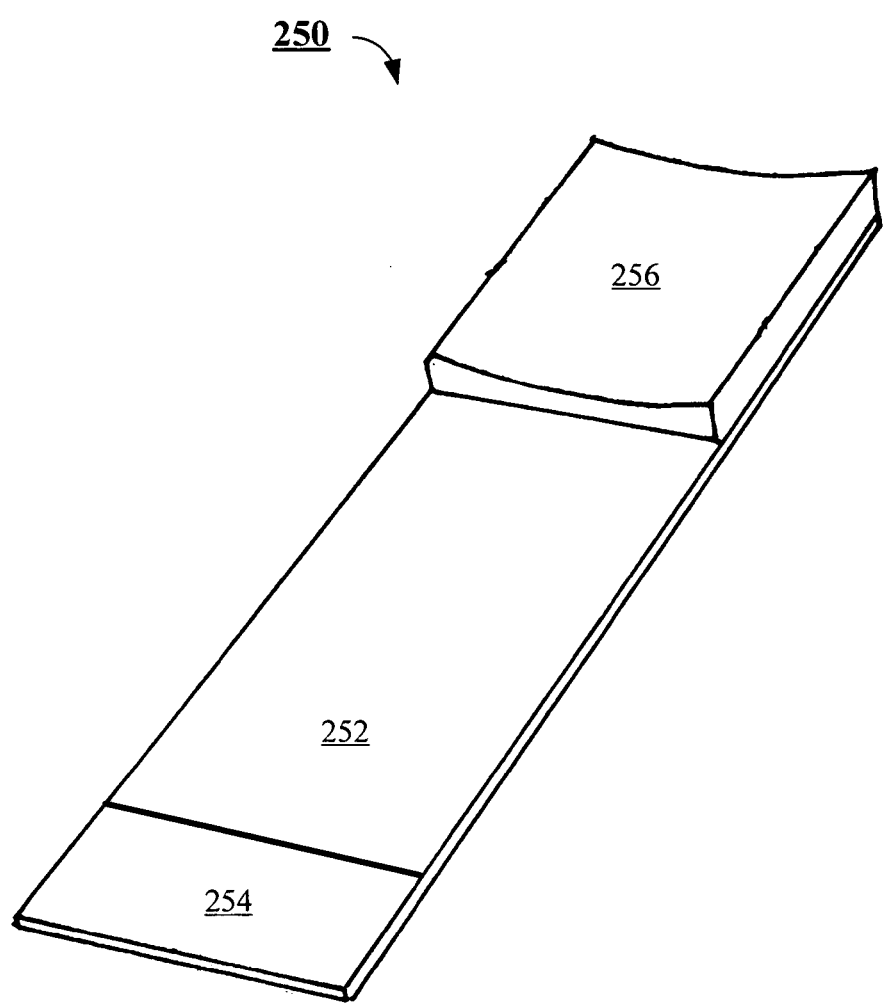
FIGS. 8–10 are alternative embodiments of the claimed subject matter.

FIG. 8 is an illustration of a caliper extender 250, which is an alternative embodiment of the claimed subject matter. Caliper extender 250 includes a body 252 and an extension 254. Extension 254, unlike extensions 112 (FIG. 1) and 164 (FIG. 6), is not designed to fit into any particularly situation, but rather nearly serves to insure that extender 250 is a uniform length regardless of which extension is attached. Caliper extender 250 includes a magnetic bar 256 that enables extender 250 to be attached to a blade such as blades 124 (FIGS. 2–5) and 190 (FIG. 7).

Figure 9:
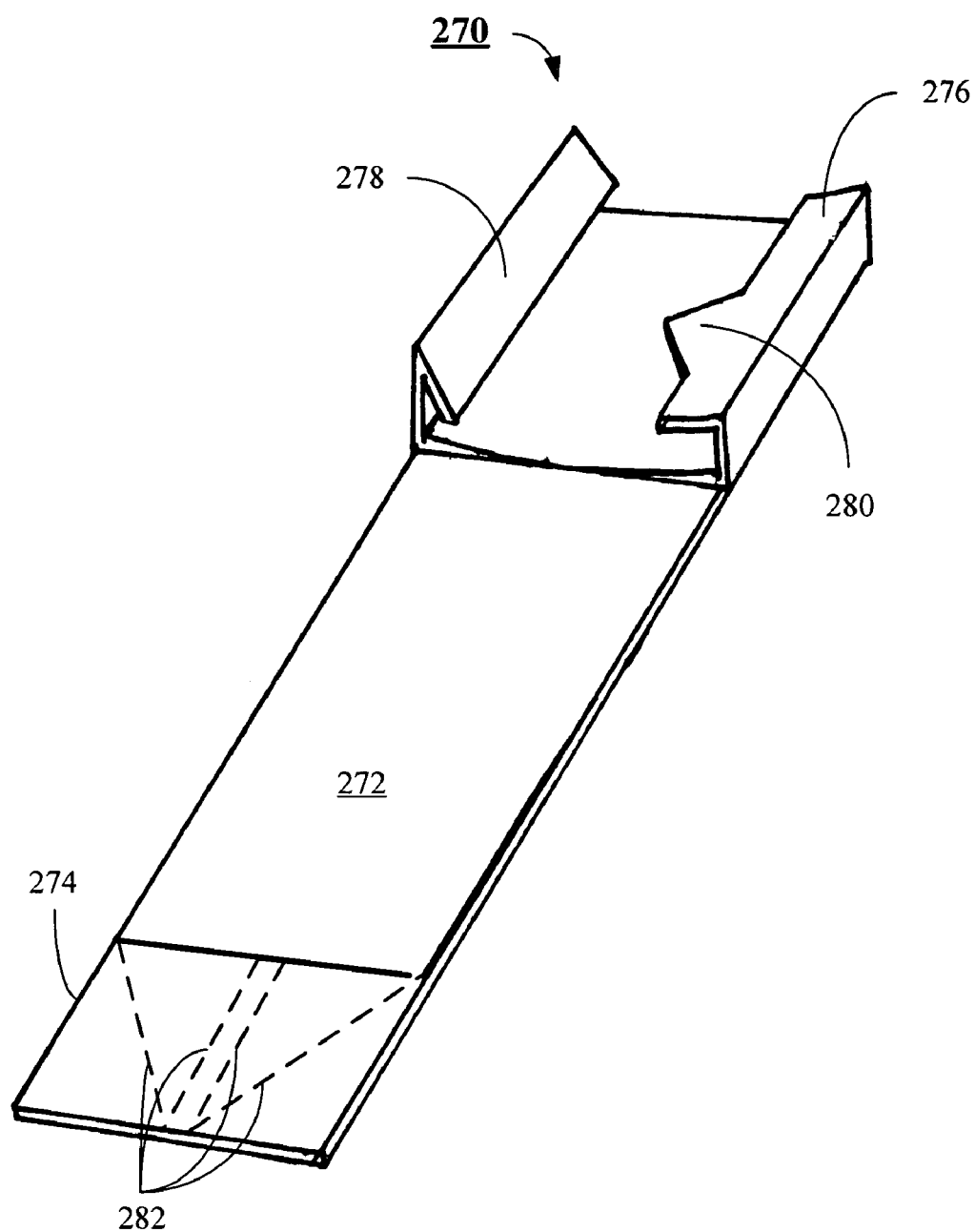

FIG. 9 is an illustration of a caliper extender 270, which is an alternative embodiment of the claimed subject matter. Caliper extender 270 includes a body 272 and an extension 274. Extender 274 is not designed to fit into any particularly situation, but rather includes guidelines 282 indicating several possible configurations so that a user is able to customize extension 274 for the user's particular needs. In other words, the user can cut, saw or break off portions of extension 274 to perform a specific job. It should be noted that any of the disclosed caliper extensions may be employed with any of the disclosed caliper extension embodiments.

Caliper extender 270 includes a clip 276, a clip 278 and a pointer 280. Clips 276 and 278 serve the same purpose as clips 104 and 106 (FIGS. 1–3 and 5) but are of a slightly different configuration.

Figure 10:
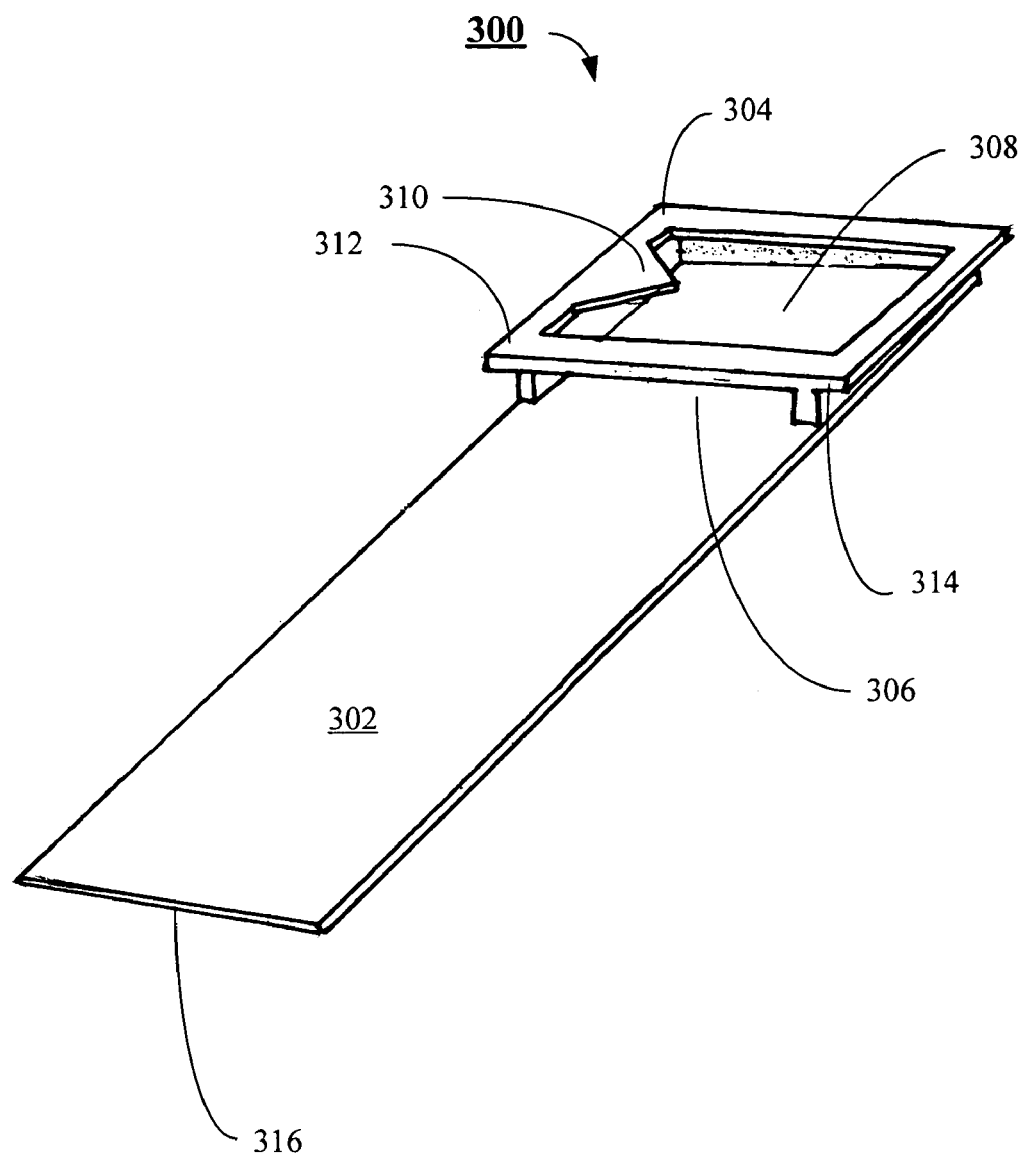
Figure 11:
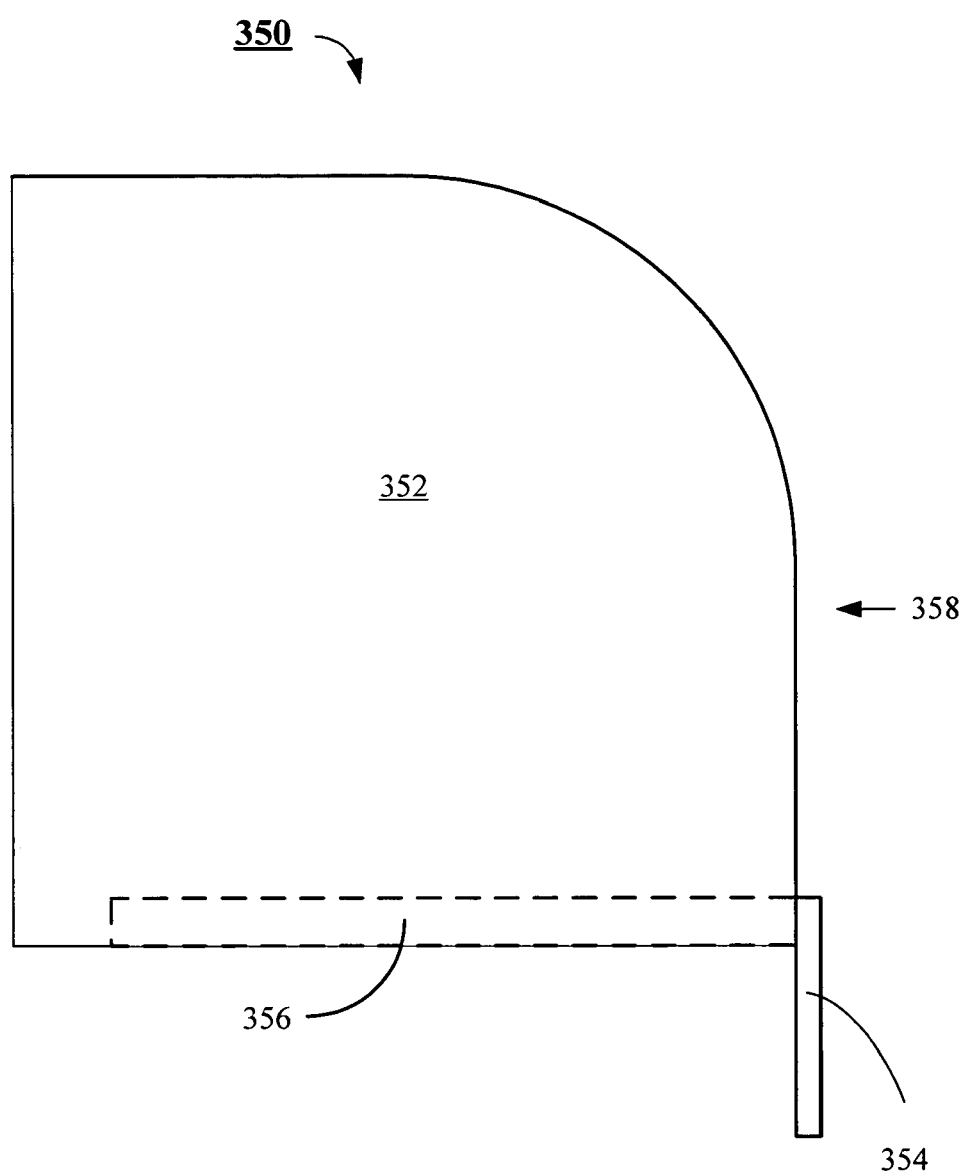
FIG. 11 is a side view of a tape measure, incorporating the caliper extender illustrated in FIG. 9.

FIG. 10 is an illustration of an alternative caliper extender 300, which is incorporated into a retractable-type tape measure 400 (see FIG. 11). Caliper extender 300 includes a body 302, like body 102 of extender 100 (FIGS. 1–5). Rather than clips 104 and 106 (FIGS. 1–3 and 5), a blade, such as a blade 190 (see FIG. 7), is held in place against body 302 by a tape guide 304. Blade 190 slides through guide 304 in a channel 306. Guide 304 includes a tape viewing window 308, which enables blade 190 to be viewed through guide 304. Within window 308 is a measuring pointer 310 that points to a precise position on blade 190 for reading an accurate measurement.

Guide 304 includes a lip 312 and a 314, which are employed to hold caliper extender 170 into tape measure 200 when caliper extender 170 is not in use. Lips 312 and 314 are explained in more detail below in conjunction with FIGS. 11 and 12. Finally, an end 316 of body 302, opposite guide 304 on body 302, is employed to make accurate measurements, in a fashion similar to that described above in conjunction with FIG. 5.

FIG. 11 is a side view of a tape measure 350 incorporating caliper extender 300 (FIG. 10). Tape measure 350 includes casing 352, typically constructed of metal or plastic. Jutting from one end of casing 352 is hook 354, which is attached to blade (not shown). Hook 354 is similar to hooks 126 (FIGS. 3–5) and 194 (FIG. 7). Although not visible in this figure, a blade corresponding to hook 354 is wound into casing 352 such that the blade can be pulled form casing 352 take make a measurements. The blade of casing 352 is typically spring-loaded in casing 352 such that, if pulled and released, the blade of casing 352 automatically retracts into casing 252. Like mention above in conjunction with blade 190 and hook 194 of FIG. 7, the hook of casing 352 both prevents the blade from being fully retracted into casing 352 and serves to hold the blade in position during some measurements by hooking around the edge of the object being measured. Casing 352, hook 354 and the associated blade should be familiar to anyone who has used a standard tape measure, which is commonly available.

Caliper extender 300 (FIG. 10), which is not visible in this figure (see FIG. 13), extends into casing 352 in a compartment 354, also not visible here but whose position within casing 352 is illustrated by dotted lines. Compartment 354 is described in more detail below in conjunction with FIGS. 12 and 13. A partial front view 358 of caliper extender 350 is illustrated below in conjunction with FIG. 12.

Figure 12:
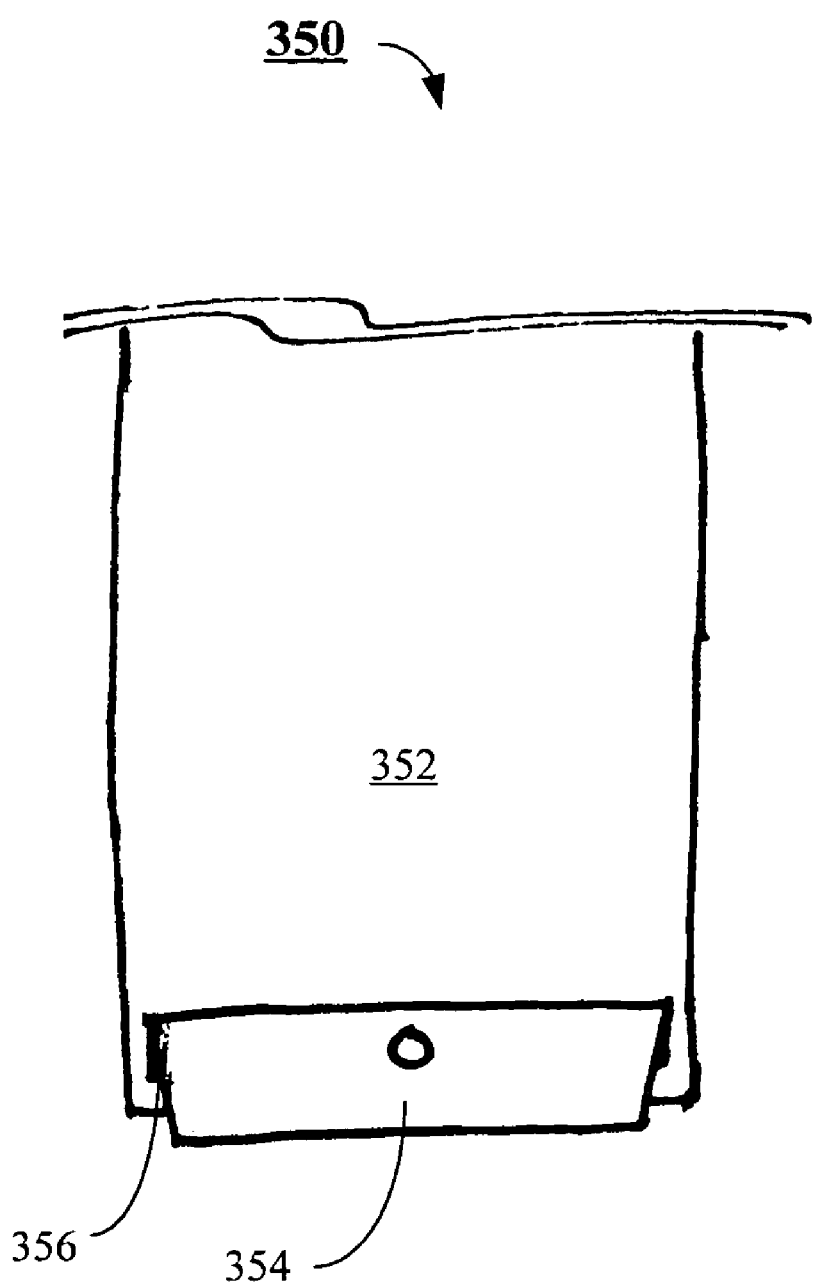
FIG. 12 is a partial front view of the tape measure introduced in FIG. 11.

FIG. 12 is an illustration of the partial front view 358 of tape measure 350 in more detail. Hook 354 (FIG. 11) is shown extending from compartment 356 (FIG. 11).

Figure 13:
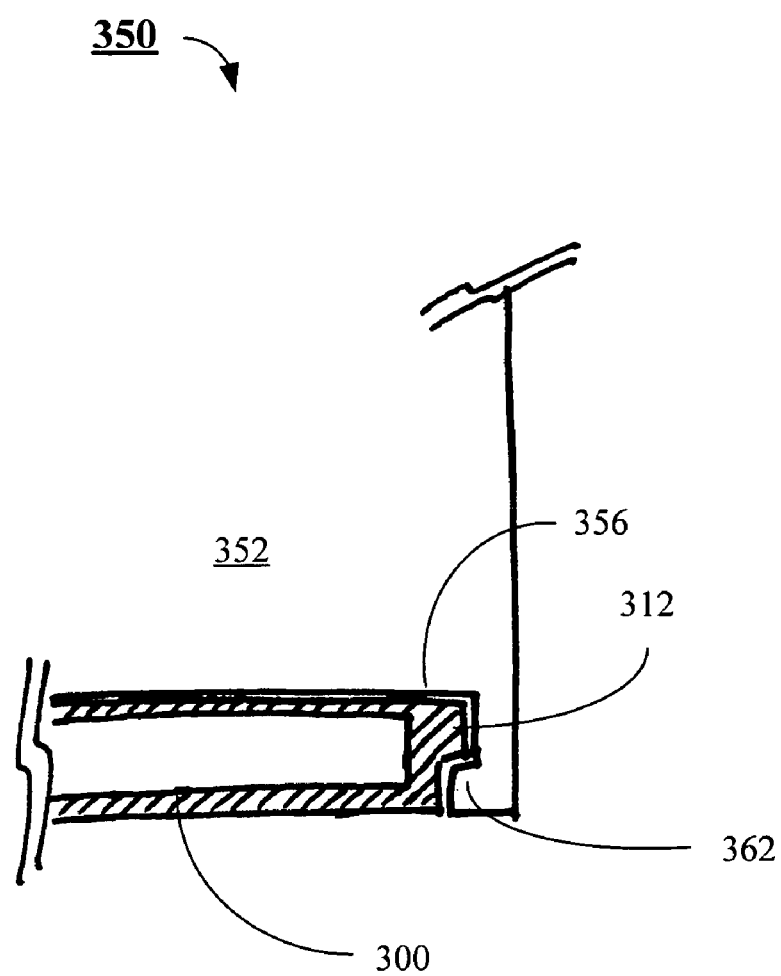
FIG. 13 is a close-up of the front view of the tape measure introduced in described above in conjunction with FIGS. 11 and 12.

FIG. 13 is an illustration of a close up of front view of tape measure 350, without the corresponding blade installed so that caliper extender 300 can be viewed. Caliper extender 300 is inserted into compartment 356. Lip 312 rests upon a ledge 362 that is part of casing 352. Ledge 362 prevents caliper extender 300 from falling out the bottom of tape measure 350 when caliper extender 300 is stored in casing 352. Of course there is another ledge (not shown) on the opposite side of casing 352 from ledge 362 that supports lip 314 (FIG. 10).

Figure 14:
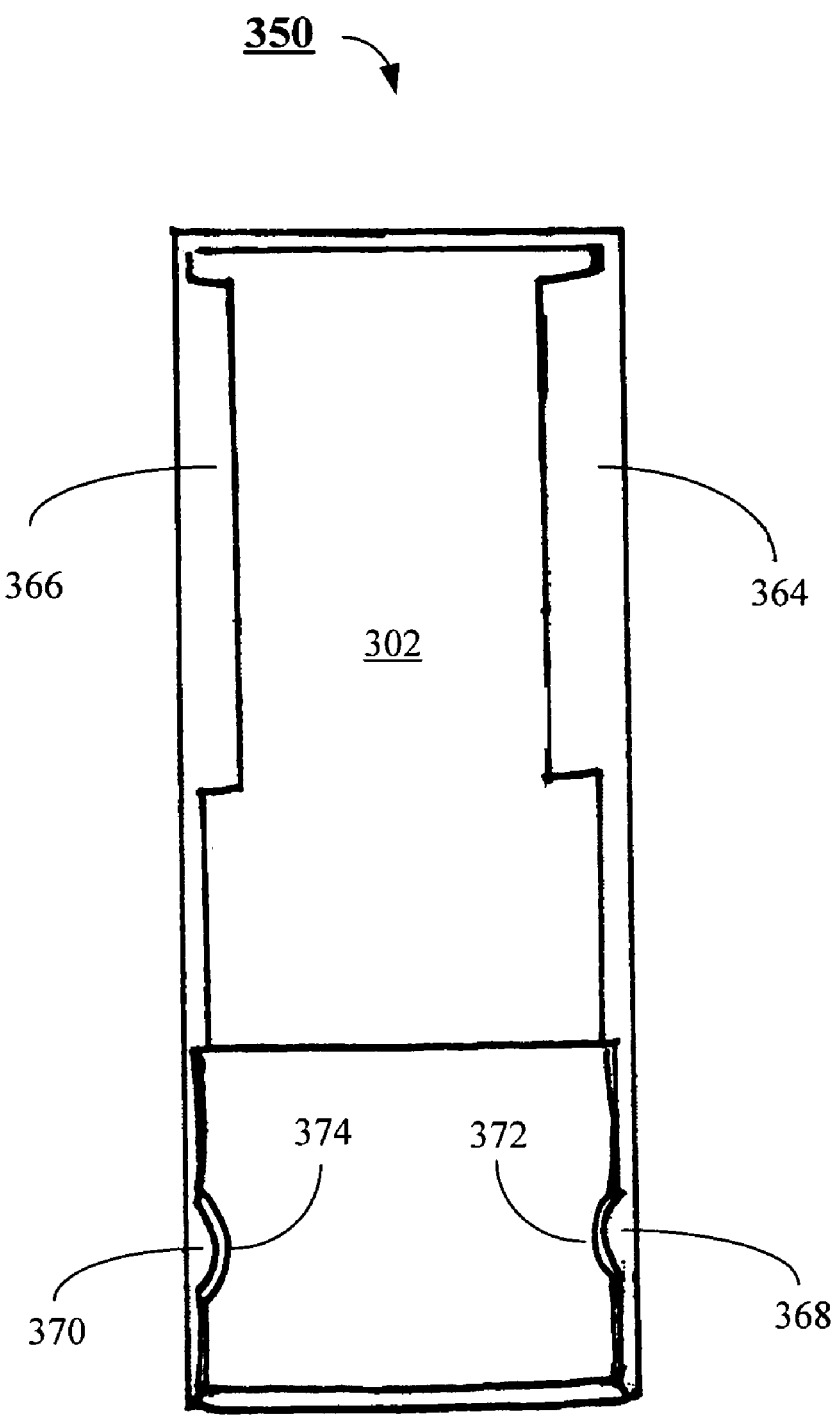
FIG. 14 is a bottom view of the tape measure introduced in FIG. 11.

FIG. 14 is an illustration of bottom view of tape measure 350, described above in conjunction FIGS. 11–13. In this view, the bottom of the body of 302 of caliper extender 300 is visible. Body 302 slides into compartment 356 (FIGS. 11–13) and is held in place by ledges 364 and 366, in addition to ledge 362 and the opposing ledge (not shown).

In casing 352, there are two nubs 368 and 370, which engage with two dimples 372 and 374, respectively, to prevent caliper extender 300 from inadvertently sliding out of compartment 356 when caliper extender 300 is in a stored position. A slight pressure on caliper extender 300 disengages nubs 368 and 370 from dimples 372 and 374 and allows extender 300 to slide free of casing 352. Thus, caliper extender 300 can slide along blade 190 (FIG. 7) enabling accurate measurements to be taken according to the procedure described in conjunction with FIG. 5.

The use of the terms "a" and "an" and "the" and similar referents in the context of describing embodiments of the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein.

What is claimed is:

1. A tape measure caliper extender, comprising:
an extender body for use with a tape blade, the extender body including an alignment clip situated on a first side of the extender body by the first end of the extender body, and an attachment clip situated on a second side of the extender body opposite the alignment clip, wherein, when the attachment clip is flexed and one edge of a tape measure blade is inserted under the alignment clip, a second edge of the tape measure blade clears the attachment clip such that the extender body is removably attachable to the tape blade, and wherein, when the attachment clip is unflexed after insertion, the alignment clip and the attachment clip hold the blade tightly enough to prevent the blade from moving vertically with respect to the body and loosely enough to allow the blade to move horizontally with respect to the body in a direction parallel to the extender body; and
wherein an accurate measurement of an object to be measured is ascertained based upon the length of the extender body and a marking of a first set of markings on a tape measure blade, at which a first end of the extender body is positioned when a second end of the extender body is positioned against a first side of the object to be measured and an end of the tape blade is positioned against a second side of the object to be measured.

2. The tape measure caliper extender of claim 1, further comprising a clip for removably attaching the tape blade.

3. The tape measure caliper extender of claim 2, further comprising a window in the clip for viewing markings on the tape blade.

4. The tape measure caliper extender of claim 1 further comprising a detachable extension positioned at the first end of the extender body wherein length of the object to be measured is ascertained based upon the length of the extender body in addition to the marking and the length of the extender body.

5. The tape measure caliper extender of claim 4, wherein the extension is configurable by a user.

6. The tape measure caliper extender of claim 1, further comprising a pointer on the alignment clip for pointing to a marking on the tape measure blade corresponding to a length measurement;
wherein the measurement is based upon the distance from the second end of the extender body to the pointer rather than the length of the extender body.

7. The tape measure caliper extender of claim 6, wherein the corresponding tape blade includes a second set of markings such that the measurement is read directly from the tape measure blade based upon a marking of the second set of markings and the pointer.

8. The tape measure caliper extender of claim 1, further comprising a pointer on the attachment clip for pointing to a marking on the tape measure blade corresponding to a length measurement;
wherein the measurement is based upon the distance from the second end of the extender body to the pointer rather than the length of the extender body.

9. The tape measure caliper extender of claim 8, wherein the corresponding tape blade includes a set of markings such that the measurement is read directly from the tape measure blade based upon the second set of markings and the pointer.

10. The tape measure caliper extender of claim 1, wherein the object to be measured is an inside dimension.

* * * * *